United States Patent [19]

MacMillan et al.

[11] Patent Number: 5,257,946
[45] Date of Patent: Nov. 2, 1993

[54] RECESSED ELECTRIC OUTLET ASSEMBLY WITH COVER PLATE

[76] Inventors: Donald A. MacMillan, 615 Main St.; Richard J. Shields, 6525 Roosevelt Dr., both of Ketchikan, Ak. 99901

[21] Appl. No.: 1,569
[22] Filed: Jan. 6, 1993
[51] Int. Cl.[5] .......................................... H01R 13/74
[52] U.S. Cl. ................................... 439/536; 174/53; 220/3.5
[58] Field of Search ............... 220/3.4, 3.5, 3.7, 3.92, 220/3.94; 174/53, 67; 439/535–537, 538, 539

[56] References Cited

U.S. PATENT DOCUMENTS

| | | | |
|---|---|---|---|
| 1,568,584 | 1/1926 | Blankenship | 439/535 |
| 1,662,275 | 3/1928 | Lane | 174/53 |
| 2,433,917 | 1/1948 | McCartney | 174/53 |
| 2,769,562 | 11/1956 | Rudolph | 220/3.4 |
| 4,059,327 | 11/1977 | Vann | 439/535 |
| 4,626,617 | 12/1986 | Rye | 174/53 |
| 4,936,794 | 6/1990 | Shaw et al. | 439/538 |
| 5,171,939 | 12/1992 | Shotey | 174/67 |

FOREIGN PATENT DOCUMENTS 2552028  5/1977  Fed. Rep. of Germany ........ 174/53

Primary Examiner—Gary F. Paumen
Attorney, Agent, or Firm—Michael I. Kroll

[57] ABSTRACT

A recessed electric outlet assembly with cover plate is provided for a wall having a sheet rock panel and wall studs, and consists of an outlet box placed through an aperture in the sheet rock panel, which is secured to one side of one of the wall studs. An electric outlet is electrically connected to wiring from within the wall and is mounted to the outlet box, so that the electric outlet is recessed with respect to the sheet rock panel. A recessed cover plate is also provided with a back portion connected to the electric outlet. A front portion of the recessed cover plate is generally flush with the sheet rock panel, so that plugs on electric cords can be inserted into the electric outlet and not protrude from the wall to be accidentally dislodged therefrom.

5 Claims, 2 Drawing Sheets

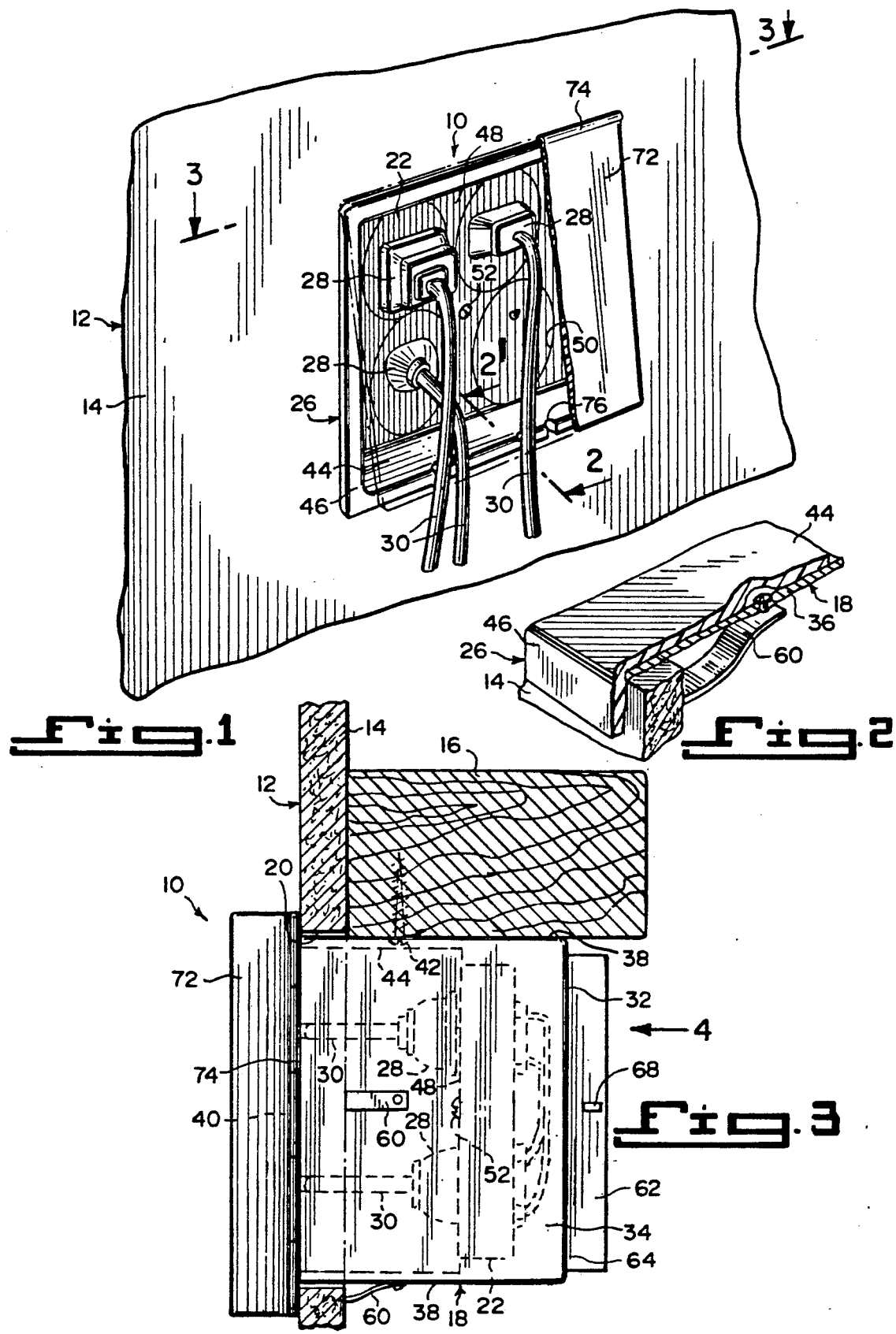

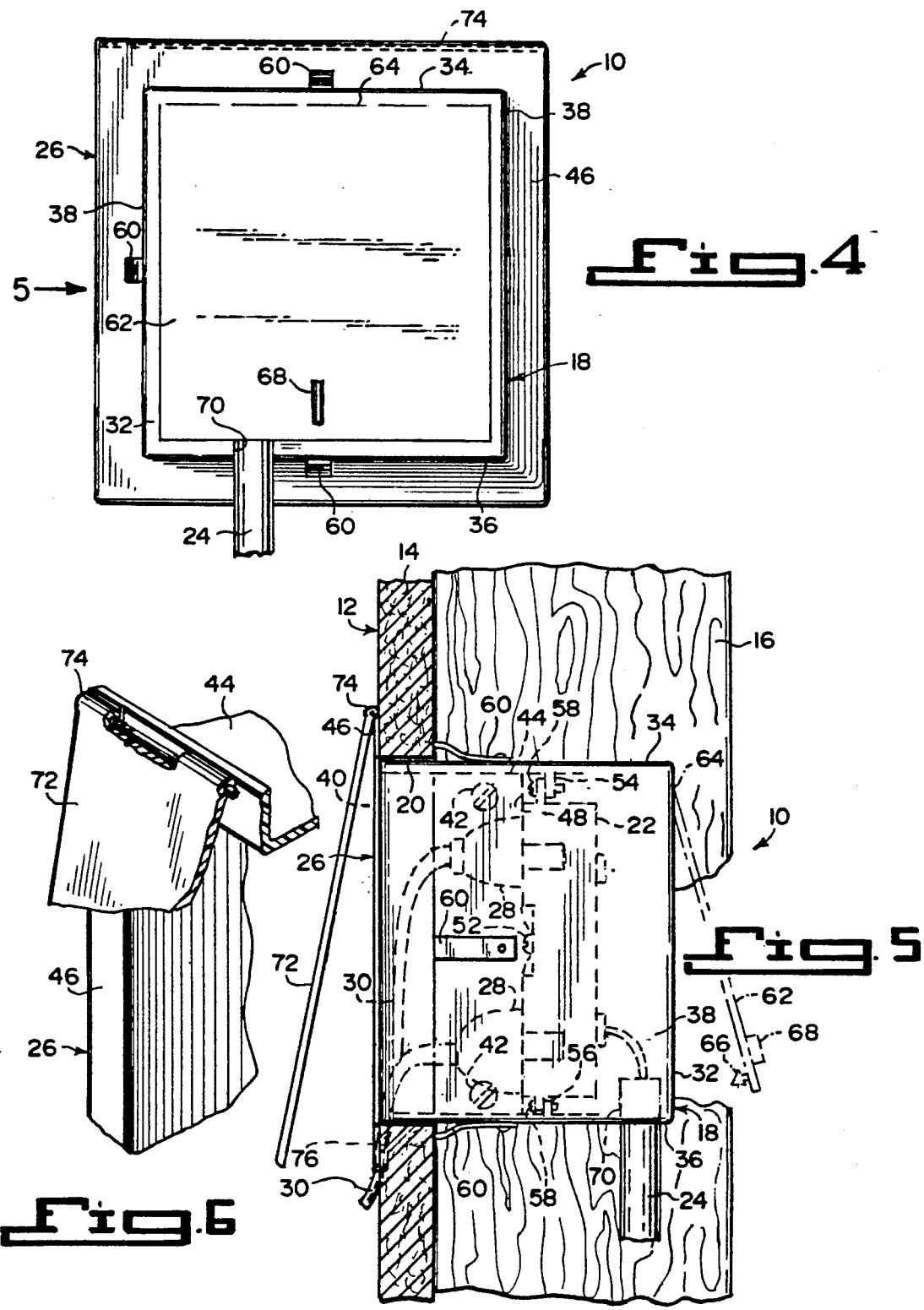

5,257,946

RECESSED ELECTRIC OUTLET ASSEMBLY WITH COVER PLATE

BACKGROUND OF THE INVENTION

1. Field of the Invention

The instant invention relates generally to electric outlets and more specifically it relates to a recessed electric outlet with cover plate.

2. Description of the Prior Art

Numerous electric outlets have been provided in prior art that are adapted to be normally mounted flush in a wall, so that they can be used for supplying current in the home, shop or laboratory from a wiring system. While these units may be suitable for the particular purpose to which they address, they would not be as suitable for the purposes of the present invention as heretofore described.

SUMMARY OF THE INVENTION

A primary object of the present invention is to provide a recessed electric outlet assembly with cover plate that will overcome the shortcomings of the prior art devices.

Another object is to provide a recessed electric outlet assembly with cover plate that allows electric cord plugs to be utilized, yet render them out of the way, so that they will not protrude from a wall to be accidentally dislodged therefrom.

An additional object is to provide a recessed electric outlet assembly with cover plate that includes a front plate hinged thereto, so that the cover plate will protect the electric cord plugs from being bumped and possibly loosened by a piece of furniture, which can cause a spark and possibly a fire to start.

A further object is to provide a recessed electric outlet assembly with cover plate that is simple and easy to use.

A still further object is to provide a recessed electric outlet assembly with cover plate that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of a first embodiment of the instant invention mounted within a wall with parts broken away.

FIG. 2 is an enlarged cross sectional perspective view taken along line 2—2 in FIG. 2, showing one of the spring clips in greater detail.

FIG. 3 is a top view taken along line 3—3 in FIG. 1.

FIG. 4 is a rear view taken in direction of arrow in FIG. 3.

FIG. 5 is a side view taken in direction of arrow in FIG. 4.

FIG. 6 is a front perspective view of a portion of the recessed cover plate showing the spring loaded hinge for the front cover in greater detail.

DETAILED DESCRIPTION OF THE PREFERRED EMBODIMENTS

Turning now descriptively to the drawings, in which similar reference characters denote similar elements throughout the several views, the Figures illustrate a recessed electric outlet assembly with cover plate 10 for a wall 12, having a sheet rock panel 14 and wall studs 16 and consists of an outlet box 18 placed through an aperture 20 in the sheet rock panel 14, which is secured to one side of one of the wall studs 16. An electric outlet 22 is electrically connected to wiring 24 from within the wall 12 and is mounted to the outlet box 18, so that the electric outlet 22 is recessed with respect to the sheet rock panel 14. A recessed cover plate 26 is also provided with a back portion connected to the electric outlet 22. A front portion of the recessed cover plate 26 overlies with the sheet rock panel 14, so that plugs 28 on electric cords 30 can be inserted into the electric outlet 22 and not protrude form the wall 12 to be accidentally dislodged therefrom.

The outlet box 18 includes a rear partition 32, a top partition 34, a bottom partition 36, a pair of side partitions 38 and has an open front end 40 to receive the electric outlet 22. A plurality of fasteners 42 extend through one side partition 38 of the outlet box 18 and into one of the wall studs 16.

The recessed cover plate 26 contains a sleeve 44 sized to fit through the aperture 20 in the sheet rock panel 14. A flange 46 is about a front edge of the sleeve 44 to fit against the sheet rock panel 14 about the aperture 20. A rear panel 48 is on a back edge of the sleeve 44 and has openings 50 therein, so that the rear panel 48 can fit against the electric outlet 22 and plugs 28 can be inserted into the electric outlet 22. A cover plate screw 52 extends through the rear panel 48 of the recessed cover plate 26 and is threaded into the electric outlet 22.

The recessed electric outlet assembly with cover plate 10, as shown in FIGS. 1 through 6 contains a first mounting tab 54 recessed within the outlet box 18 and extends downwardly from the top partition 34. A second mounting tab 56 is recessed within the outlet box 18 and extends upwardly from the bottom partition 36 and is in alignment with the first mounting tab 54. A pair of mounting screws are for retaining the electric outlet 22 to the first mounting tab 54. A pair of mounting screws 58 are for retaining the electric outlet 22 to the first mounting tab 4 and the second mounting tab 56. The sleeve 44 will now fit into the open front end 40 of the outlet box 18, to allow the rear panel 48 to fit against the electric outlet 22.

Three spring clips 60 are each mounting to the exterior surface of the top partition 34, the bottom partition 36 and the side partition 38 opposite from the side partition 38 with the fasteners 42. The spring clips 60 will help retain the outlet box 18 to the sheet rock panel 14.

The rear partition 32 of the outlet box 18 has a back flap 62 formed therein, with a top edge 64 of the back flap 62 hinged thereto. The back flap 62 can be opened to gain access into the outlet box 18, to reach the back of the electric outlet 22 and the wiring 24 from within the wall 12. A latch 66 is on an inner surface of the back flap 62 opposite from the hinge 64, so as to retain the back flap 62 thereto when closed. A handle 68 is on the outer surface of the back flap 62 opposite from the hinge 64, so that the back flap 62 can be opened.

The bottom partition 36 has a vertical indent 70 adjacent the rear partition 32 of the outlet box 18. The wiring 24 from within the wall 12 can pass through the vertical indent 70 and be electrically connected to the back of the electric outlet 22, enabling the back flap 62 to close flush with the rear partition 32 of the outlet box 18.

A front door 72 is sized to cover the flange 46 of the recessed cover plate 26. A spring hinge 74 is between a top edge of the front door 72 and an upper edge of the flange 46 of the recessed cover plate 18, so as to normally bias the front door 72 closed. The flange 46 has a plurality of vertical slots 76 in its lower portion, so that the electric cords 30 extending from the plugs 28 can pass through the vertical slots 76, enabling the front door 72 to close flush against the flange 46 of the recessed cover plate 26.

LIST OF REFERENCE NUMBERS

10: recessed electric outlet assembly with cover plate
12: wall
14: sheet rock panel
16: wall stud
18: outlet box
20: aperture in 14
22: electric outlet
24: wiring in 12
26: recessed cover plate
28: plug
30: electric cord
32: rear partition of 18
34: top partition of 18
36: bottom partition of 18
38: side partition of 18
40: open front end of 18
42: fastener
44: sleeve of 26
46: flange of 26
48: rear panel of 26
50: opening in 48
52: cover plate screw
54: first mounting tab
56: second mounting tab
58: mounting screw
60: spring clip
62: back flap
64: hinged top edge
66: latch on 62
68: handle on 62
70: vertical indent in 36
72: front door
74: spring hinge between 72 and 46
76: vertical slot in 46

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A recessed electric outlet assembly with cover plate for a wall having a sheet rock panel and wall studs, which comprises:
   a) an outlet box placed through an aperture in said sheet rock panel;
   b) means for securing said outlet box to one side of one of said wall studs;
   c) an electric outlet electrically connected to wiring from within said wall;
   d) means for mounting said electric outlet to said outlet box, so that said electric outlet is recessed with respect to said sheet rock panel;
   e) a recessed cover plate; and
   f) means for connecting a back portion of said recessed cover plate to said electric outlet, with a front portion of said recessed cover plate overlying said sheet rock panel, so that plugs on electric cords can be inserted into said electric outlet and not protrude from said wall to be accidentally dislodged therefrom;
   wherein said outlet box includes a rear partition, a top partition, a bottom partition, a pair of side partitions and having an open front end to receive said electric outlet;
   wherein said securing means includes a plurality of fasteners, each extending through one said side partition of said outlet box and into one of said wall studs;
   wherein said recessed cover plate includes:
   a) a sleeve sized to fit through said aperture in said sheet rock panel;
   b) a flange about a front edge of said sleeve to fit against said sheet rock panel about said aperture; and
   c) a rear panel on a back edge of said sleeve, said rear panel having openings therein, so that said rear panel can fit against said electric outlet and plugs can be inserted into said electric outlet;
   wherein said connecting means is a cover plate screw extending through said rear panel of said recessed cover plate and threaded into said electric outlet;
   wherein said mounting means includes:
   a) a first mounting tab recessed within said outlet box and extending downwardly from said top partition;
   b) a second mounting tab recessed within said outlet box and extending upwardly from said bottom partition and in alignment with said first mounting tab; and
   c) a pair of mounting screws for retaining said electric outlet to said first mounting tab and said second mounting tab, so that said sleeve will now fit into said open front end of said outlet box to allow said rear panel to fit against said electric outlet;
   further including three spring clips each mounted to the exterior surface of said top partition, said bottom partition and said side partition opposite from said side partition with said fasteners, so that said spring clips will help retain said outlet box to said sheet rock panel;
   further including said rear partition of said outlet box having a back flap formed therein, with a top edge of said back flap hinged thereto, so that said back flap can be opened to gain access into said outlet box to reach the back of said electric outlet and said wiring from within said wall.

2. A recessed electric outlet assembly with cover plate as recited in claim 1, further including:
   a) a latch on an inner surface of said back flap opposite from said hinge, so as to retain said back flap thereto when closed; and
   b) a handle on said outer surface of said back flap opposite from said hinge, so that said back flap can be opened.

3. A recessed electric outlet assembly with cover plate as recited in claim 2, further including said bottom partition having a vertical indent adjacent said rear partition of said outlet box, so that said wiring from within said wall can pass through said vertical indent and be electrically connected to the back of said electric outlet, enabling said back flap to close flush with said rear partition of said outlet box.

4. A recessed electric outlet assembly with cover plate as recited in claim 3, further including:
   a) a front door sized to cover said flange of said recessed cover plate; and
   b) a spring hinge between a top edge of said front door and an upper edge of said flange of said recessed cover plate, so as to normally bias said front door closed.

5. A recessed electric outlet assembly with cover plate as recited in claim 4, further including said flange having a plurality of vertical slots in its lower portion, so that said electric cords extending from said plugs can pass through said vertical slots, enabling said front door to close flush against said flange of said recessed cover plate.

* * * * *